United States Patent [19]

Zetterberg

[11] 4,083,477
[45] Apr. 11, 1978

[54] BAITING TOOL FOR STORING AND DISPENSING FISH BAIT

[76] Inventor: Niklas F. Zetterberg, 64584 Hughes Rd., Bend, Oreg. 97701

[21] Appl. No.: 712,922

[22] Filed: Aug. 9, 1976

[51] Int. Cl.² .................................. G01F 11/02
[52] U.S. Cl. .................. 222/386; 128/218 R; 128/261; 141/21
[58] Field of Search .................. 222/386, 326, 327; 128/218 R, 218 G, 235, 261; 141/21

[56] References Cited

U.S. PATENT DOCUMENTS

| | | | |
|---|---|---|---|
| 1,741,326 | 12/1929 | McNally | 222/386 X |
| 2,236,727 | 4/1941 | Dewees | 222/386 |
| 2,578,765 | 12/1951 | Wallace | 222/386 X |
| 2,831,483 | 4/1958 | DeLorenzo | 222/386 X |
| 3,354,882 | 11/1967 | Coanda | 128/218 P |

FOREIGN PATENT DOCUMENTS

| | | | |
|---|---|---|---|
| 1,057,415 | 10/1953 | France | 222/386 |
| 709,563 | 7/1941 | Germany | 222/386 |
| 659,272 | 1/1964 | Italy | 222/386 |

*Primary Examiner*—Robert B. Reeves
*Assistant Examiner*—Frederick R. Handren
*Attorney, Agent, or Firm*—Mahoney, Schick & Cislo

[57] ABSTRACT

An elongated cylinder having a hollow cylindrical extension member received press fit in a discharge open end thereof normally receives an elongated plunger in an opposite receiving open end with said plunger having a piston-like end within the cylinder selectively slideable along the cylinder to dispense fish bait of putty-like consistency from the cylinder through the extension member. The cylinder preferably has a uniform outer cylindrical surface except for an annular, outwardly projecting portion at the plunger receiving end thereof and a finger gripping ring is telescoped over the cylinder outer surface selectively slideable therealong movable to the cylinder plunger receiving end against the outwardly projecting portion for normal bait dispensing use of the cylinder and plunger, but movable to the cylinder discharge end for removal of the plunger from the cylinder and insertion of the cylinder plunger receiving end into a supply of fish bait to fill the same. The plunger piston-like end is preferably peripherally outwardly flared to bear resiliently outwardly internally against the cylinder during fish bait dispensing and the plunger receiving end of the cylinder is preferably outwardly angled to aid in insertion of the plunger flared end into the cylinder. The cylinder extension member may have an end cap flexibly connected thereto and press fit positionable thereover for sealing off the cylinder and extension member, and a hollow cylindrical insert may be press fit received in the extension member for reducing the size of opening thereof.

2 Claims, 7 Drawing Figures

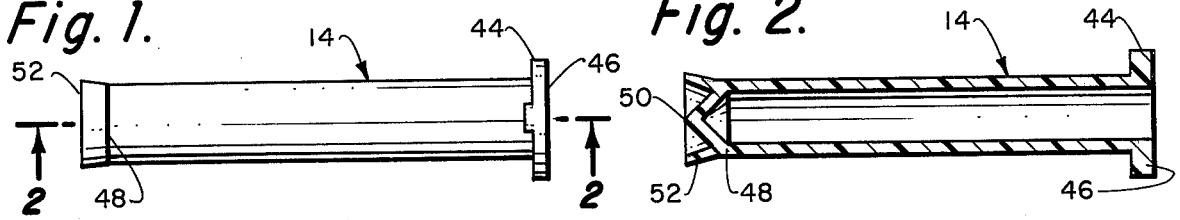
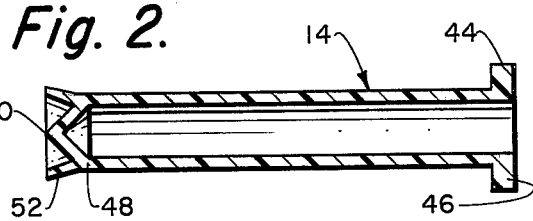
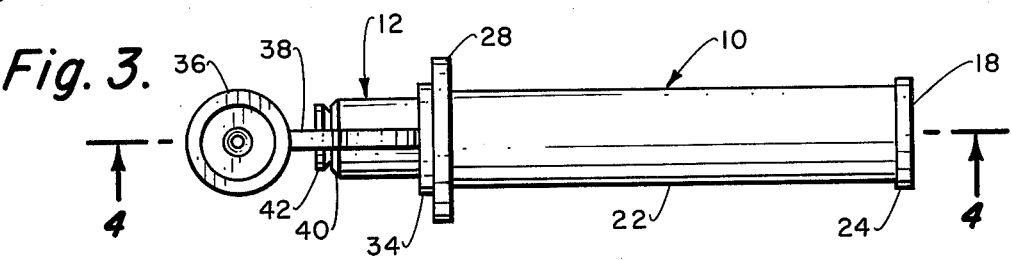
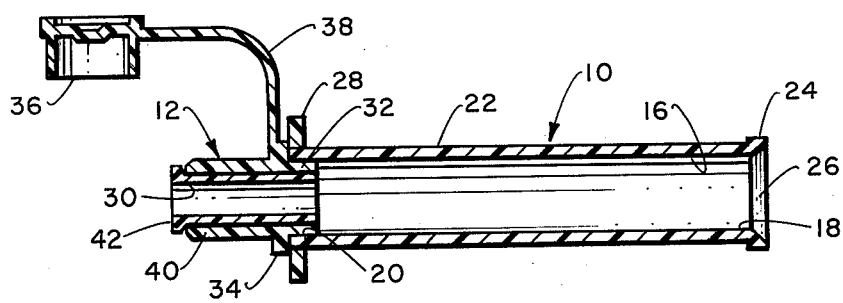
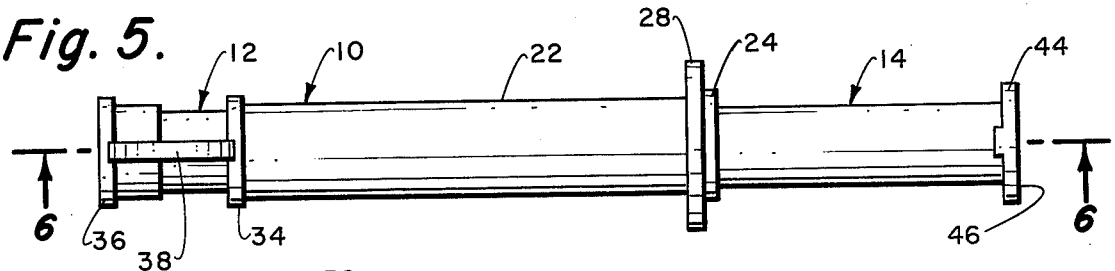
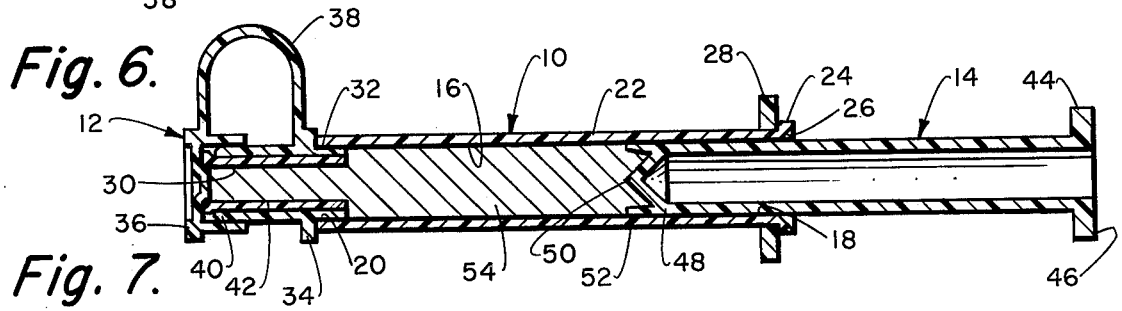
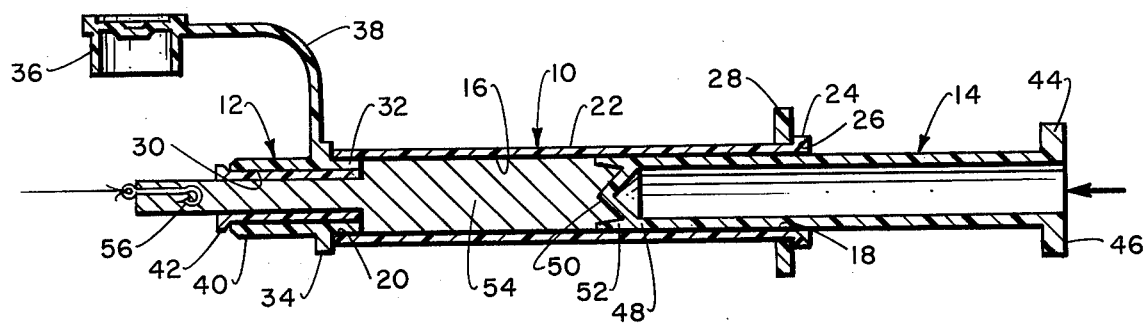

BAITING TOOL FOR STORING AND DISPENSING FISH BAIT

BACKGROUND OF THE INVENTION

This invention relates to a baiting tool for storing and dispensing fish bait, and more particularly, to a cylinder-plunger type of baiting tool for storing and dispensing fish bait of putty-like consistency. According to certain of the principles of the present invention, various improvements are included in the baiting tool providing increased convenience of filling and use, more positive selective fish bait dispensing therefrom and more complete protection of the fish bait stored in the tool from atmospheric deterioration. Other improvements and advantages of the unique baiting tool of the present invention will be apparent from the following specification and claims.

From the very general standpoint, various constructions of cylinder-plunger type of baiting tools for dispensing fish bait of a putty-like consistency have heretofore been provided, for instance, such tools being generally capable for dispensing cheese and other similar commonly used fish baits normally provided in the putty-like consistency required. A quantity of the fish bait is installed in the cylinder of the tool by one manner or another and the exposed surface of the bait is forced to the bait dispensing or discharge end of the cylinder by depressing of the plunger, thereby properly conditioning the tool ready for use. When a quantity or slug of the fish bait is desired, either the fish hook upon the which the bait is to be installed is inserted in the bait at the discharge end of the cylinder and then the slug of bait is forced from the cylinder by further depression of the plunger, or the slug of bait is first forced from the cylinder and then engaged by the fish hook, in either case, the slug of bait ultimately being separated from the supply of bait within the cylinder at the cylinder discharge end. Further slugs of bait are similarly used from the tool until the bait supply therein is exhausted and the tool is then refilled for further continued use.

One of the principal objections to the cylinder-plunger type of baiting tools heretofore provided has been the difficulty in maintaining the supply of putty-like bait therein during an extended period of use in a fresh, properly moist condition. Obviously, unless the bait within the tool is maintained against exposure to the surrounding atmosphere, partial and even complete drying out thereof can take place. If the supply of bait within the cylinder of the tool becomes even partially dried out by a loss of moisture such as water or various oils therein, such bait can be not only more difficult to dispense from the tool, but in most cases will be of a far less desirable condition for attracting the fish sought to be caught. Furthermore, such drying can cause the bait to lose its putty-like consistency necessary for the same to adhere to the fish hook in water and thereby be of nonusable form.

The answer to this problem would appear, at first glance, of a relatively simple solution. Loss of moisture of the supply of bait within the tool, as indicated in the foregoing, is due to exposure to the surrounding atmosphere. Thus, as long as the cylinder of the tool is of a closed nature, this would appear to prevent exposure of the bait within the tool to the surrounding atmosphere and thereby prevent the objectionable drying out.

It has been found, however, that one of the principal causes of drying out in baiting tools of this general character is due to the quantity of air trapped in the cylinder of the tool between the plunger thereof and the supply of bait installed therein. When a particular tool is exhausted of its supply of bait, the usual procedure for refilling of the same is the retraction of the plunger a maximum distance exposing a major portion of the cylinder interior and the discharge end of the cylinder is then forced downwardly into a bulk quantity of the bait, thereby forcing a partial filling of the cylinder interior from the discharge end thereof. This traps a quantity of air between the plunger and the now cylinder contained supply of bait and it has been found that this air trapped within the tool is a major cause of the deterioration of the tool bait supply.

Another major objection to the prior form of the subject baiting tools herein involved is the fact that for a given size of baiting tool, only a single size of bait slug can be dispensed therefrom. That is to say, with the prior baiting tools, a given size of tool will dispense a given size of usually cylindrical bait slug therefrom, although obviously the length of the slug can be varied. This means that if small diameter cylindrical bait slugs are desired, an appropriately small tool must be used and if large diameter cylindrical bait slugs are desired, a larger tool must be used. Thus, for use in fishing for different size species of fish on different occasions, quite common with the avid fisherman, a supply of tools of varying sizes must be maintained by the fisherman.

OBJECTS AND SUMMARY OF THE INVENTION

It is, therefore, an object of this invention to provide a baiting tool for storing and dispensing fish bait of the type generally of putty-like consistency wherein the tool is formed for accomplishing the bait filling operation in a vastly improved manner and for storing the bait supply therein, both in manners eliminating exposure of the bait to the surrounding atmosphere and thereby not at any time subjecting the bait to deterioration such as drying and the like. According to certain of the principles of the present invention, a finger gripping ring surrounding the tool cylinder is normally maintained positioned at a cylinder plunger receiving end so that with a supply of bait within the cylinder, the plunger may be slideably operated in a somewhat usual manner for dispensing the bait from an opposite cylinder discharge end. However, when the bait supply within the tool is exhausted and refilling of the cylinder is required, the finger gripping ring may be selectively slid toward the cylinder discharge end and the plunger completely withdrawn and removed. Thus, the cylinder may be refilled with a bait supply from the plunger receiving end thereof, rather than from the discharge end. The ultimate result is that after such bait filling and repositioning of the finger gripping ring at its original location adjacent the cylinder plunger receiving end, the plunger may be reinserted into the cylinder directly against the new supply of bait therein and no air can be trapped between the plunger and bait supply which could cause bait deterioration during storage thereof and during use as has been prevalent with the prior constructions.

It is a further object of this invention to provide a baiting tool of the foregoing general character which may be uniquely formed for selectively dispensing slugs of the fish bait of different selected sizes so as to readily adapt the tool for use in supplying different size bait slugs for different fish species, thereby eliminating the necessity of maintaining a supply of different sizes of baiting tools. According to certain other of the principles of the present invention, the cylinder at the discharge end thereof is formed with a hollow cylindrical extension press fit therein and such extension is adapted for the selective installation of one or more hollow cylindrical inserts therein of reduced size. Therefore, in use of the tool without any extension insert therein, a maximum diameter of bait slug is dispensed, while use of the tool with a selected extension insert installed dispenses bait of an appropriate small diameter, all from a single tool size.

It is also an object of this invention to provide a baiting tool of the foregoing general character which may have an improved cylinder and plunger construction and cooperation so as to more completely ensure against air leakage therein which could cause the previously discussed stored bait deterioration, yet such improved cylinder and plunger still remains quickly and efficiently disassemblable and reassemblable during a bait supply filling operation as described. The plunger of the tool is preferably formed with a peripherally outwardly flared piston-like end which preferably bears resiliently outwardly against the cylinder during installation of the plunger in the cylinder, thereby effectively sealing the bait supply within the cylinder from the surrounding atmosphere. At the same time, the plunger receiving end of the cylinder is preferably outwardly angled internally thereof toward the termination of the cylinder end permitting easy and convenient insertion of the plunger into the cylinder along such angled surfaces despite the plunger end flared formation.

Other objects and advantages of the invention will be apparent from the following specification and the accompanying drawings which are for the purpose of illustration only.

BRIEF DESCRIPTION OF THE DRAWING

FIG. 1 is a side elevational view of a preferred embodiment of a plunger for the baiting tool incorporating the principles of the present invention, said plunger being removed from a cylinder of the baiting tool;

FIG. 2 is a horizontal sectional view of the plunger of FIG. 1 looking in the direction of the arrows 2—2 in FIG. 1;

FIG. 3 is a side elevational view of a preferred embodiment of cylinder of the baiting tool incorporating the principles of the present invention, such cylinder having the baiting tool plunger of FIGS. 1 and 2 removed therefrom and having an end cap removed from end covering position;

FIG. 4 is a horizontal sectional view through the cylinder of FIG. 3 looking in the direction of the arrows 4—4 in FIG. 3;

FIG. 5 is a side elevational view of the plunger of FIGS. 1 and 2 assembled with the cylinder of FIGS. 3 and 4 in an operative position of the baiting tool, the cylinder having a supply of fish bait therein and having the end cap in end covering position;

FIG. 6 is a horizontal sectional view of the assembled baiting tool of FIG. 5 looking in the direction of the arrows 6—6 in FIG. 5; and FIG. 7 is a horizontal sectional view of the baiting tool of FIGS. 5 and 6, but with the end cap removed and the fish bait being dispensed after engagement by a fish hook.

DESCRIPTION OF THE BEST EMBODIMENT CONTEMPLATED

Referring to the drawings, a preferred embodiment of the baiting tool of the present invention includes a cylinder generally indicated at 10 preferably provided with an extension member generally indicated at 12, and a plunger generally indicated at 14. The various elements of the baiting tool are preferably formed of injection molded, somewhat resilient plastic of usual form, that is, any of the commonly known plastics suitable for the intended purpose. Furthermore, the baiting tool may be manufactured by usual production procedures well known to those skilled in the art.

More particularly, the cylinder 10 has the somewhat usual uniform, central cylindrical opening 16 throughout the axial or longitudinal length thereof terminating at one end in a plunger receiving open end 18 and at the other end in a dispensing or discharge open end 20. A uniform, cylindrical outer surface 22, also extends the entire length of the cylinder 10 except for an annular, radially outwardly projecting portion 24 directly at the plunger receiving end 18. Important to certain of the principles of the present invention, the cylindrical opening 16 of the cylinder 10 terminates at the plunger receiving end 18 in an annular, outwardly angled or tapered end surface 26 angling outwardly toward that terminal end of the cylinder internally thereof. Also important to certain of the principles of the present invention, the uniform outer surface 22 of the cylinder 10 is encompassed by a finger gripping ring 28 which is selectively slideable along the cylinder uniform outer surface between axial abutment against the cylinder outwardly projecting portion 24 at the cylinder plunger receiving end 18 as shown, for instance, in FIG. 5, toward and to the cylinder discharge end 20 as shown, for instance, in FIG. 3, all for a purpose to be hereinafter described.

The extension member 12 is generally hollow cylindrical having a uniform inner cylindrical opening 30 and a mounting end portion 32 is press fit into the cylinder discharge end 20 up to an extension abutment flange 34. A removable end cap 36 is flexibly connected to the extension member flange 34 through a flexible strap 38 so that this end cap may be selectively press fit over an extending outer end 40 of the extension member 12 to thereby selectively seal off the extension member and cylinder 10. Varying internal size hollow cylindrical inserts 42 may also be selectively received press fit within the inner opening 30 of the extension member 12 for altering the cylindrical size of this extension member opening as shown, for instance, in FIG. 4.

Completing the baiting tool assembly, the plunger 14 is preferably cylindrical in outer configuration except for a stop flange 44 at an outer end 46 thereof and a radially closed piston-like inner end 48. According to certain of the principles of the present invention, the piston-like inner end 48 is uniquely formed terminating axially in a central conical portion 50 surrounded by an annular, thinning, flared portion 52, the latter being of increased resilience or flexibility due to the thinning thereof.

Thus, in assembling the plunger 14 with the cylinder 10, the piston-like inner end 48 of the plunger is inserted axially into the cylinder plunger receiving end 18, the plunger flared portion 52 compressing smoothly inwardly by easy reception along the tapered or outwardly angled end surface 26 of the cylinder. After the plunger piston-like inner end 48 is received fully within the cylinder inner opening 16, the plunger flared portion 52 will bear resiliently outwardly against the walls of the cylinder 10 properly slideably sealing therewith for proper cylinder-plunger operation. Furthermore, it is preferred that the cylinder 10 and plunger 14 will be of proper cooperative lengths so that maximum reception of the plunger within the cylinder will not disturb the assembled connection between the cylinder and its extension member 12.

In the use of the baiting tool of the present invention, and assuming that the same is empty of any of the putty-like fish bait to be dispensed, such as cheese or similar fish baits, the first operation required is that of filling with a supply of the fish bait. This is uniquely and advantageously accomplished by first removing the end cap 36 from its position sealing off the extension member 12 and completely removing the plunger 14 from the cylinder 10 resulting in the assembled cylinder and extension member in the condition shown in FIGS. 3 and 4. Note that the finger gripping ring 28 has been slid totally to the discharge end 20 of the cylinder 10 against the extension member 12 so as to be completely clear of the cylinder plunger receiving end 18.

The cylinder plunger receiving end 18 is then forceably inserted downwardly into a bulk supply of the particular fish bait with, most importantly, the fish bait filling the cylinder 10 from this plunger receiving end 18 to any desired amount within the capacity of the cylinder. With the finger gripping ring 28 at the opposite end of the cylinder 10, no interference is encountered therefrom. Upon repositioning of the finger gripping ring 28 to the cylinder plunger receiving end 18, the plunger 14 is then replaced and it will be noted that the pistonlike end 48 of the plunger, due to the bait filling of the cylinder 10 from the plunger receiving end 18 thereof, will directly contact the supply of bait within the cylinder without trapping air therebetween so as to eliminate one of the major sources of stored bait deterioration as hereinbefore discussed. By continued depression of the plunger 14 against the bait supply now installed within the cylinder 10, the supply of bait may be moved entirely to the extremity of the extension member 12 in the manner shown in FIG. 6, but with the end cap 36 still removed so that when the end cap is secured over the extension member in the manner shown in FIG. 6, the supply of bait within the baiting tool will be virtually free of any contact with air or the surrounding atmosphere which could cause the deterioration during storage.

When it is desired to use the supply of fish bait within the baiting tool, such supply of fish bait being indicated at 54 in FIGS. 6 and 7, the end cap 36 is removed from the extension member 12 and a fish hook 56 may either be directly inserted into the fish bait 54 within the extension member or the plunger 14 may be operated to discharge or dispense a slug of the fish bait outwardly from the extension member followed by fish hook engagement. In either case, the slug of the fish bait 54 within which the fish hook 56 is engaged is ultimately broken off or separated from the baiting tool supply thereof at the termination of the extension member to be used on the fish hook for fishing. The end cap 36 is then replaced so that the baiting tool reassumes the air tight enclosure of FIG. 6 until a next use of the fish bait supply.

The baiting tool of the present invention is shown in the drawings with one of the inserts 42 positioned within the extension member 12 for illustration purposes, but it is obvious that upon removal of the insert 42, the extension member inner opening 30 alone would determine the cylindrical size or diameter of the slug of fish bait 54 being dispensed. With the insert 42 installed, of course, the slug size of the fish bait 54 will be smaller as determined by such insert. Furthermore, in use of the baiting tool for dispensing the fish bait 54 therefrom, the positioning of the finger gripping ring 28 at the cylinder plunger receiving end 18 against the cylinder projecting portion 24 will permit the usual hand operation of the cylinder 10 and plunger 14, despite the fact that this finger gripping ring may be removed from such normal operating location for the fish bait supply filling operation as hereinbefore described.

According to the principles of the present invention, therefore, a unique baiting tool is provided for storing and dispensing fish bait having the many advantages hereinbefore discussed over prior similar constructions. The baiting tool is particularly adapted for a complete formation thereof from molded plastic, thereby benefiting from maximum economy. Furthermore, with the many unique features of construction, not only is the baiting tool smoothly and conveniently operable for its fish bait dispensing purposes, but is equally efficiently usable for the contained fish bait storing purposes without the danger of fish bait deterioration. Finally, with slight selected predicated changes, the baiting tool may be converted for dispensing slugs of the fish bait of varying desired sizes.

I claim:

1. In a baiting tool for storing and dispensing fish bait of putty-like consistency, the combination of: elongated tubular cylinder means with opposite discharge and plunger receiving open ends and adapted for receiving a piston therein, a uniform cylindrical outer surface along said cylinder means terminating at said discharge end in a radially outwardly projecting portion and at said plunger receiving end in a relatively short radially outwardly projecting portion; an elongated plunger having a piston-like end, said plunger normally having said piston-like end thereof received in said cylinder means plunger receiving end with said plunger selectively slideable along said cylinder means to dispense said fish bait from said cylinder means discharge end; an outer finger gripping ring telescoping and adapted for being selectively slideable along said cylinder means uniform cylindrical outer surface to and from said outwardly projecting portion of said cylinder means plunger receiving end and to and from said outwardly projecting portion at said discharge end, said finger gripping ring projecting radially outwardly a markedly greater distance than said outwardly projecting portion of said cylinder means plunger receiving end, said finger gripping ring being adapted for being slideably positioned toward said cylinder means plunger receiving end against said outwardly projecting portion during dispensing of said fish bait by said plunger, said finger gripping ring being adapted for being slideably positioned toward said cylinder means discharge end against said outwardly projecting portion during filling of said cylinder means by removal of said plunger and insertion and forcing of said cylinder means plunger receiving end into a bulk supply of said fish bait, the radial projection, of said radially outwardly projecting portion of said cylinder means plunger receiving end, beyond said uniform cylindrical outer surface being only sufficient to retain said outer finger gripping ring to avoid interference with the insertion and movement of said cylinder means plunger receiving end into said bulk supply of said fish bait.

2. In a baiting tool as defined in claim 1 in which said cylinder means includes a cylinder having a uniform outer surface throughout the length thereof except for said outwardly projecting portion at said cylinder means plunger receiving end, said cylinder means discharge end being formed by a hollow cylindrical extension member having an end part slideably press fit into said cylinder, said extension member having a radially outwardly projecting portion abutting said discharge end of said cylinder and projecting radially outwardly beyond said cylinder uniform outer surface against which said finger gripping ring is adapted for being slideably positioned during said cylinder means filling.

* * * * *